United States Patent
Oshiro

(10) Patent No.: US 6,756,891 B2
(45) Date of Patent: Jun. 29, 2004

(54) METHOD AND APPARATUS FOR DETECTING DECREASE IN TIRE AIR-PRESSURE, AND SELECTING PROGRAM FOR THE THRESHOLDS FOR JUDGING DECOMPRESSION OF TIRE

(75) Inventor: Yuji Oshiro, Kobe (JP)

(73) Assignees: Sumitomo Rubber Industries, Ltd., Hyogo-ken (JP); Sumitomo Electric Industries, Ltd., Osaka-fu (JP)

( * ) Notice: Subject to any disclaimer, the term of this patent is extended or adjusted under 35 U.S.C. 154(b) by 0 days.

(21) Appl. No.: 10/219,663

(22) Filed: Aug. 16, 2002

(65) Prior Publication Data

US 2003/0034884 A1 Feb. 20, 2003

(30) Foreign Application Priority Data

Aug. 16, 2001 (JP) ........................................ 2001-247331

(51) Int. Cl.[7] .............................................. B60C 23/00
(52) U.S. Cl. ........................ 340/444; 340/442; 73/146.2
(58) Field of Search ................................ 340/444, 442, 340/443, 446, 447; 73/146.1, 146.2

(56) References Cited

U.S. PATENT DOCUMENTS

| | | | | |
|---|---|---|---|---|
| 5,035,137 A | * | 7/1991 | Burkard et al. | 73/146.5 |
| 5,578,984 A | * | 11/1996 | Nakajima | 340/444 |
| 5,959,202 A | * | 9/1999 | Nakajima | 73/46.2 |
| 6,060,983 A | * | 5/2000 | Yanase et al. | 340/442 |
| 6,222,444 B1 | * | 4/2001 | Wang | 340/442 |
| 6,285,280 B1 | * | 9/2001 | Wang | 340/444 |

FOREIGN PATENT DOCUMENTS

| | | |
|---|---|---|
| DE | 196 25 544 C | 8/1997 |
| EP | 0 552 827 A1 | 7/1993 |
| EP | 0 773 118 A | 5/1997 |
| JP | 9-66714 | 3/1997 |
| JP | 10-6725 | 1/1998 |
| JP | 10-76823 | 3/1998 |

OTHER PUBLICATIONS

Patent Abstracts of Japan, vol. 2000, No. 20, Jul. 10, 2001.
European Search Report, Sep. 1, 2003.

* cited by examiner

*Primary Examiner*—Nina Tong
(74) *Attorney, Agent, or Firm*—Birch, Stewart, Kolasch & Birch, LLP

(57) ABSTRACT

A method for detecting decrease in tire air-pressure for detecting decrease in internal pressure of a tire on the basis of rotational information obtained from tires attached to a vehicle. A threshold for judging decrease in air-pressure of following wheels is different from a threshold for judging decrease in air-pressure of driving wheels. Threshold for judging abnormalities in air-pressure are varied for judging abnormalities of tire air-pressures of following wheels and for judging abnormalities of tire air-pressure of driving wheels so that appropriate judgment of abnormalities in air-pressure can be performed.

9 Claims, 4 Drawing Sheets

METHOD AND APPARATUS FOR DETECTING DECREASE IN TIRE AIR-PRESSURE, AND SELECTING PROGRAM FOR THE THRESHOLDS FOR JUDGING DECOMPRESSION OF TIRE

BACKGROUND OF THE INVENTION

The present invention relates to a method and an apparatus for detecting decrease in tire air-pressure as well as a selecting program for thresholds for judging decompression of a tire. More particularly, it relates to a method and an apparatus for detecting decrease in tire air-pressure as well as a selecting program for thresholds for judging decompression of a tire which is capable of improving the accuracy of a detection of decompression.

A conventional apparatus for detecting decrease in tire air-pressure (DWS system) judges a decompressed condition of a tire based on information of four ABS wheel speed sensors. For judging decompression of a tire in this apparatus, a judged value is employed in which a difference between two diagonal sums of front wheel tires and rear wheel tires is compared. Since a single threshold is used for judging anomalies in air-pressure of the four wheel tires, an alarm for indicating an abnormality of the tire air-pressure is generated no matter which of the tires of the driving wheels and the follower wheels are abnormal.

However, it can be understood, from data as illustrated in FIG. 4 in which a FF (front engine/front drive) vehicle (Accord produced by Honda Motor Co., Ltd. with tire sizes of 205/60R15) mounted with either a front left tire (driving wheel) FL or a rear left tire (follower wheel) RL of which air-pressure has been decompressed by 30% was made to perform running, that values for judging abnormalities in air-pressure (judged value) are different between the driving wheel FL and the following wheel RL although the decompressed conditions are identical at 30%.

When employing the current technique in which a threshold is used which is set to be lower than the judged value for the following wheel RL but higher than the judged value for the driving wheel FL, it is impossible to judge an abnormal condition of the air-pressure unless the degree of decompression of the driving wheel tire FL is high whereas an abnormal condition of the following wheel RL is detected already at a low degree of decompression.

SUMMARY OF THE INVENTION

The present invention has been made in view of the above facts, and it is an object thereof to provide a method and an apparatus for detecting decrease in tire air-pressure as well as a selecting program for thresholds for judging decompression of a tire which are capable of improving the accuracy of detection of decompression.

In accordance with a first aspect of the present invention, there is provided a method for detecting decrease in tire air-pressure for detecting decrease in internal pressure of a tire on the basis of rotational information obtained from tires attached to a vehicle, wherein a threshold for judging decrease in air-pressure of following wheels is different from a threshold for judging decrease in air-pressure of driving wheels.

In accordance with a second aspect of the present invention, there is provided an apparatus for detecting decrease in tire air-pressure for detecting decrease in internal pressure of a tire on the basis of rotational information obtained from tires attached to a vehicle, comprising: a rotational information detecting means for detecting rotational information of respective tires; a steering angle detecting means for detecting a steering angle; a memory means for storing the rotational information of the respective tires and the steering angle; a straight-ahead drive judging means for judging, based on the steering angle, whether the vehicle is performing straight-ahead driving; a turning radius calculating and processing means for calculating a turning radius on the basis of the rotational information of the tires; a comparing and determining means for determining, on the basis of the turning radius as calculated by the turning radius calculating and processing means, whether the vehicle is performing straight-ahead driving or not in case it has been determined on the basis of the steering angle that the vehicle is performing straight-ahead driving; a threshold selecting means for selecting a threshold for judging decrease in air-pressure on the basis of the determination of the comparing and determining means; and a judged value calculating and processing means for calculating a judged value of decompression of air-pressure on the basis of the threshold.

In accordance with a third aspect of the present invention, there is provided a selecting program for a threshold for judging decompression of a tire which is so arranged that, for selecting a threshold for judging decrease in tire air-pressure, a computer is made to function as a rotational information detecting means for detecting rotational information of respective tires, a steering angle detecting means for detecting a steering angle, a memory means for storing the rotational information of the respective tires and the steering angle, a straight-ahead drive judging means for judging, based on the steering angle, whether the vehicle is performing straight-ahead driving, a turning radius calculating and processing means for calculating a turning radius on the basis of the rotational information of the tires, a comparing and determining means for determining, on the basis of the turning radius as calculated by the turning radius calculating and processing means, whether the vehicle is performing straight-ahead driving or not in case it has been determined on the basis of the steering angle that the vehicle is performing straight-ahead driving, and a threshold selecting means for selecting a threshold for judging decrease in air-pressure on the basis of the determination of the comparing and determining means, and a judged value calculating and processing means for calculating a judged value of decompression of air-pressure on the basis of the threshold.

DETAILED DESCRIPTION

The method and apparatus for detecting decrease in tire air-pressure as well as the selecting program for thresholds for judging decompression of a tire according to the present invention will now be explained with reference to the accompanying drawings.

Figure 1:
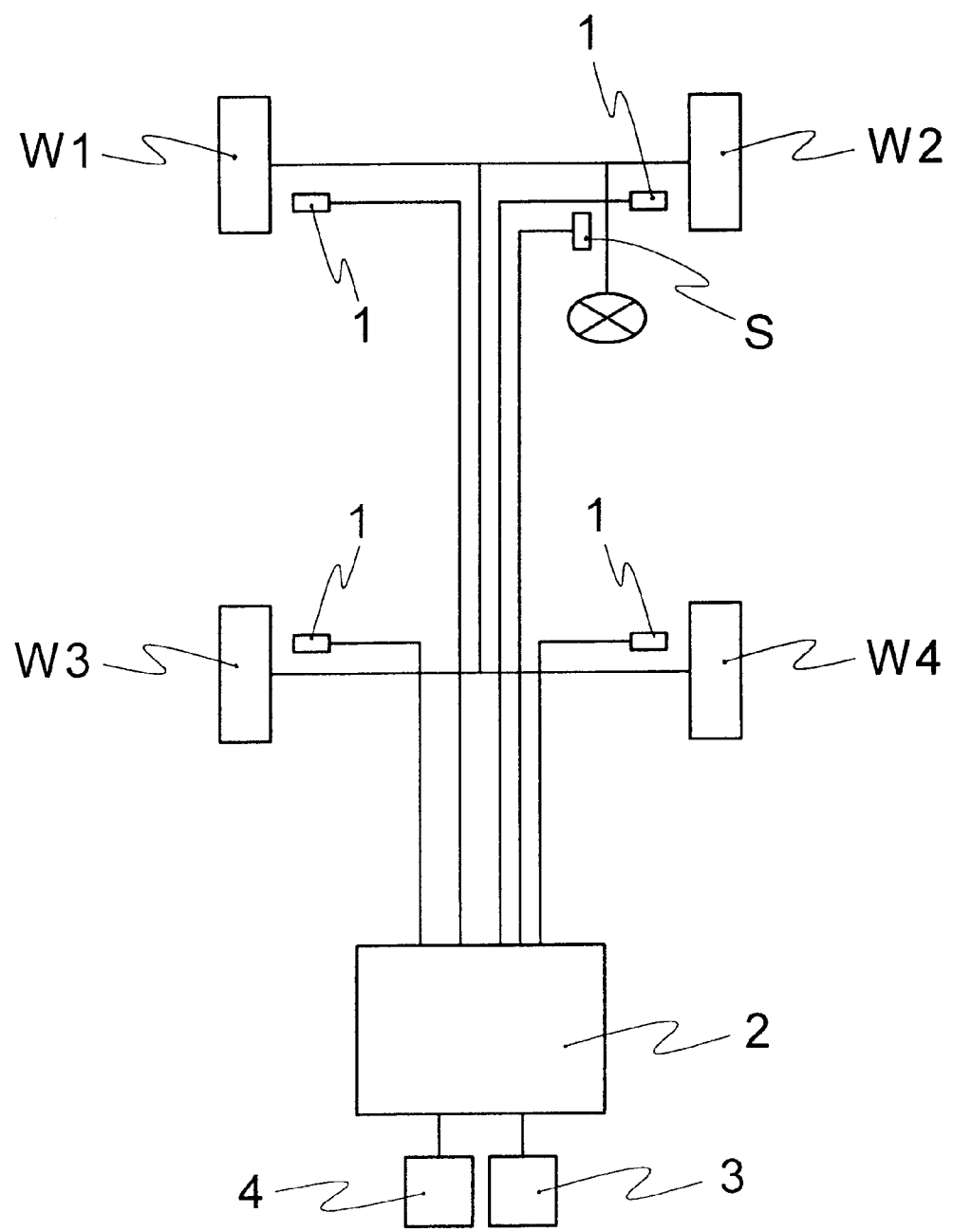
FIG. 1 is a block diagram illustrating one embodiment of the apparatus for detecting decrease in tire air-pressure according to the present invention.

As illustrated in FIG. 1, the apparatus for detecting decrease in tire air-pressure according to one embodiment of the present invention is for detecting whether an air-pressure of four tires W1, W2, W3 and W4 (Wi, i=1 to 4, 1: front left tire, 2: front right tire, 3: rear left tire and 4: rear right tire) mounted to a four-wheeled vehicle is present or not, and includes ordinary rotation information detecting means 1 provided in relation with the respective tires Wi, and a steering angle detecting means S for detecting a steering angle of the wheels (vehicle).

The rotational information detecting means 1 might be a wheel speed sensor for measuring wheel speeds (rotational speeds) on the basis of number of pulses upon generating rotational pulses by using an electromagnetic pickup or similar, or an angular velocity sensor in which power is generated by using rotation such as in a dynamo whereupon the wheel speeds are measured by using this voltage. The steering angle detecting means S might be an ordinary steering angle sensor. Outputs of the rotational information detecting means 1 and the steering angle detecting means are sent to a control unit 2 which is composed of a computer such as an ABS. A display means 3 comprising liquid crystal elements, plasma display elements or CRT and an initializing switch 4 which can be operated by a driver are connected to the control unit 2.

Figure 2:
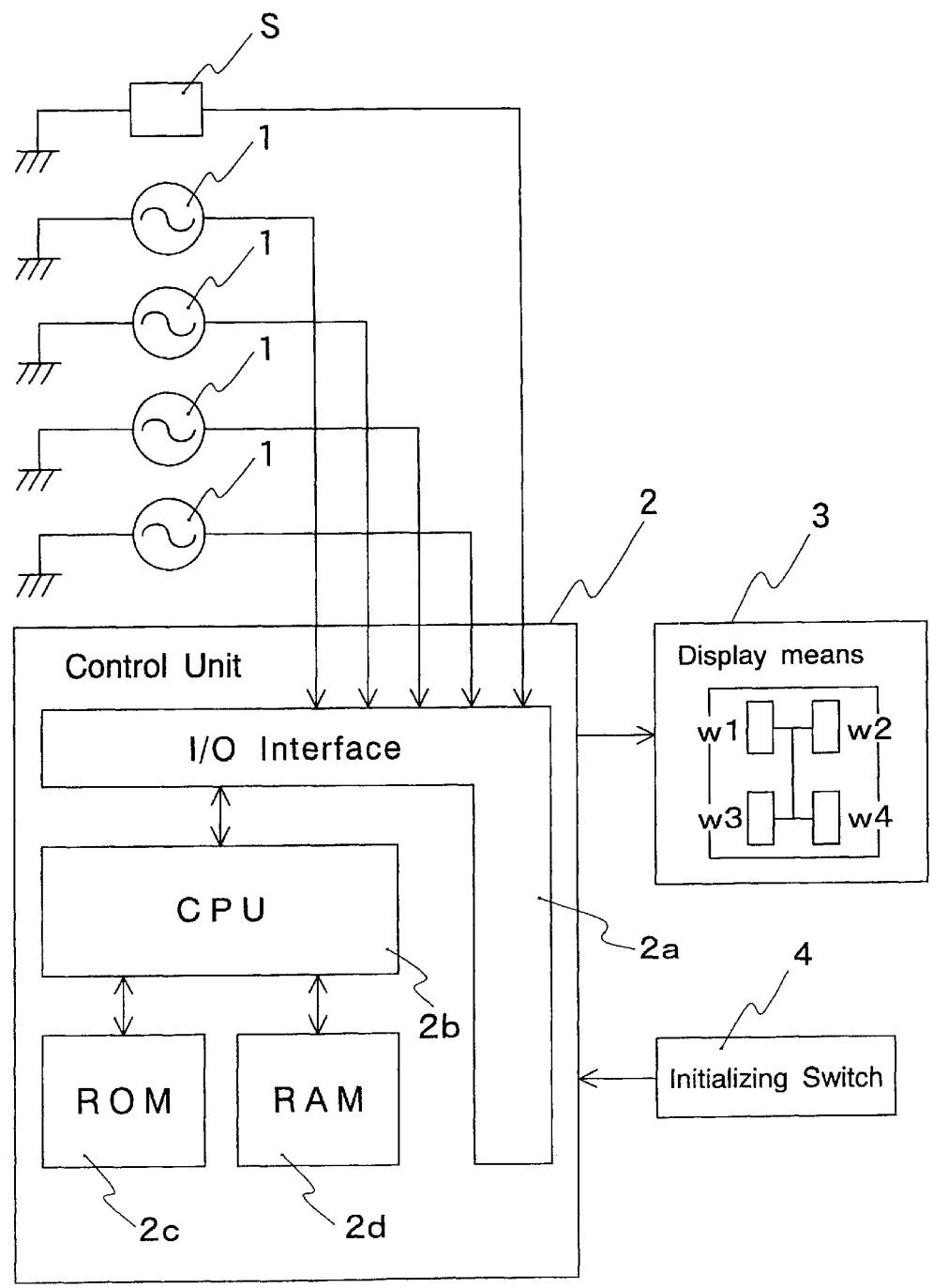
FIG. 2 is a block diagram illustrating electric arrangements of the apparatus for detecting decrease in tire air-pressure of FIG. 1.

The control unit 2 comprises, as illustrated in FIG. 2, an I/O interface 2a required for sending/receiving signals to/from an external device, a CPU 2b which functions as a center of calculation, a ROM 2c which stores a control operation program for the CPU 2b, and a RAM 2d into which data are temporally written and are read out therefrom when the CPU 2b performs control operations.

The apparatus of the present embodiment includes the rotational information detecting means 1 for detecting rotational information of respective tires, the steering angle detecting means S for detecting a steering angle, a memory means for storing the rotational information of the respective tires and the steering angle, a straight-ahead drive judging means for judging, based on the steering angle, whether the vehicle is performing straight-ahead driving, a turning radius calculating and processing means for calculating a turning radius on the basis of the rotational information of the tires, a comparing and determining means for determining, on the basis of the turning radius as calculated by the turning radius calculating and processing means, whether the vehicle is performing straight-ahead driving or not in case it has been determined on the basis of the steering angle that the vehicle is performing straight-ahead driving, a threshold selecting means for selecting a threshold for judging decrease in air-pressure on the basis of the determination of the comparing and determining means, and a judged value calculating and processing means for calculating a judged value of decompression of air-pressure on the basis of the threshold. Moreover, in the selecting program for thresholds for judging decompression of a tire according to the present embodiment, the control unit 2 is made to function as the memory means for storing the rotational information of the respective tires and the steering angle, the straight-ahead drive judging means for judging, based on the steering angle, whether the vehicle is performing straight-ahead driving, the turning radius calculating and processing means for calculating a turning radius on the basis of the rotational information of the tires, the comparing and determining for determining, on the basis of the turning radius as calculated by the turning radius calculating and processing means, whether the vehicle is performing straight-ahead driving or not in case it has been determined on the basis of the steering angle that the vehicle is performing straight-ahead driving, the threshold selecting means for selecting a threshold for judging decrease in air-pressure on the basis of the determination of the comparing and determining means, and a judged value calculating and processing means for calculating a judged value of decompression of air-pressure on the basis of the threshold.

In the rotational information detecting means 1, pulse signals corresponding to the number of rotation of tire Wi (hereinafter referred to as "wheel speed pulse") are output. In the CPU 2b, rotational angular velocities $F_i$ for respective tires Wi are calculated on the basis of the wheel speed pulse as output from the rotational information detecting means 1 at specified sampling periods $\Delta T(sec)$, for instance, $\Delta T=1$.

Since the tires Wi include variations (initial differences) within standards, effective rolling radii r of the respective tires Wi (a value obtained by dividing a distance that has been traveled by a single rotation by $2\pi$) are not necessarily identical even though all of the tires are at normal internal pressure. This will result in variations in the rotational angular velocities $F_i$ of the respective tires Wi. Thus, rotational angular velocities $F1_i$ which have been corrected to cancel variations owing to initial differences are calculated. More particularly, corrections are performed to satisfy $F1_1 = F_1$ $F1_2 = mF_2$ $F1_3 = F_3$ $F1_4 = nF_4$ The correction coefficients m and n are obtained as $m=F_1/F_2$ and $n=F_3=F_4$ on the basis of rotational angular velocities $F_i$ which have been calculated on the premise that the vehicle is performing straight-ahead driving.

The speeds Vi of the respective tires Wi and the speed V of the vehicle is calculated by using the following equation on the basis of the $F1_i$.

$Vi = r \times F1_i$ $V = (V1+V2+V3+V4)/4$

Here, V(i): wheel speed of the tire (m/sec)

i: 1 =front left tire, 2=front right tire, 3=rear left tire and 4=rear right tire.

For obtaining the judged value of decompression (DEL) for detecting decrease in air-pressure of tire Wi, differences between two diagonal sums of, for instance, the front wheel tires and the rear wheel tires are compared, wherein a sum of signals of one pair of wheels located on one diagonal line is subtracted from a sum of signals of another pair of wheels located on the other diagonal line, and a ratio of this obtained value to an average value of the two sums is obtained based on the following equation (1).

$$DEL = \{(V1+V4)/2 - (V2+V3)/2\}/\{(V1+V2+V3+V4)/4\} \times 100(\%) \quad (1)$$

In the present embodiment, thresholds for judging abnormalities in air-pressure are changed for detecting abnormalities in tire air-pressure of the following wheels and for detecting abnormalities in tire-air pressure of the driving wheels.

The following explanations are based on an example in which the vehicle is a FF (front engine/front drive) vehicle.

Figure 3:
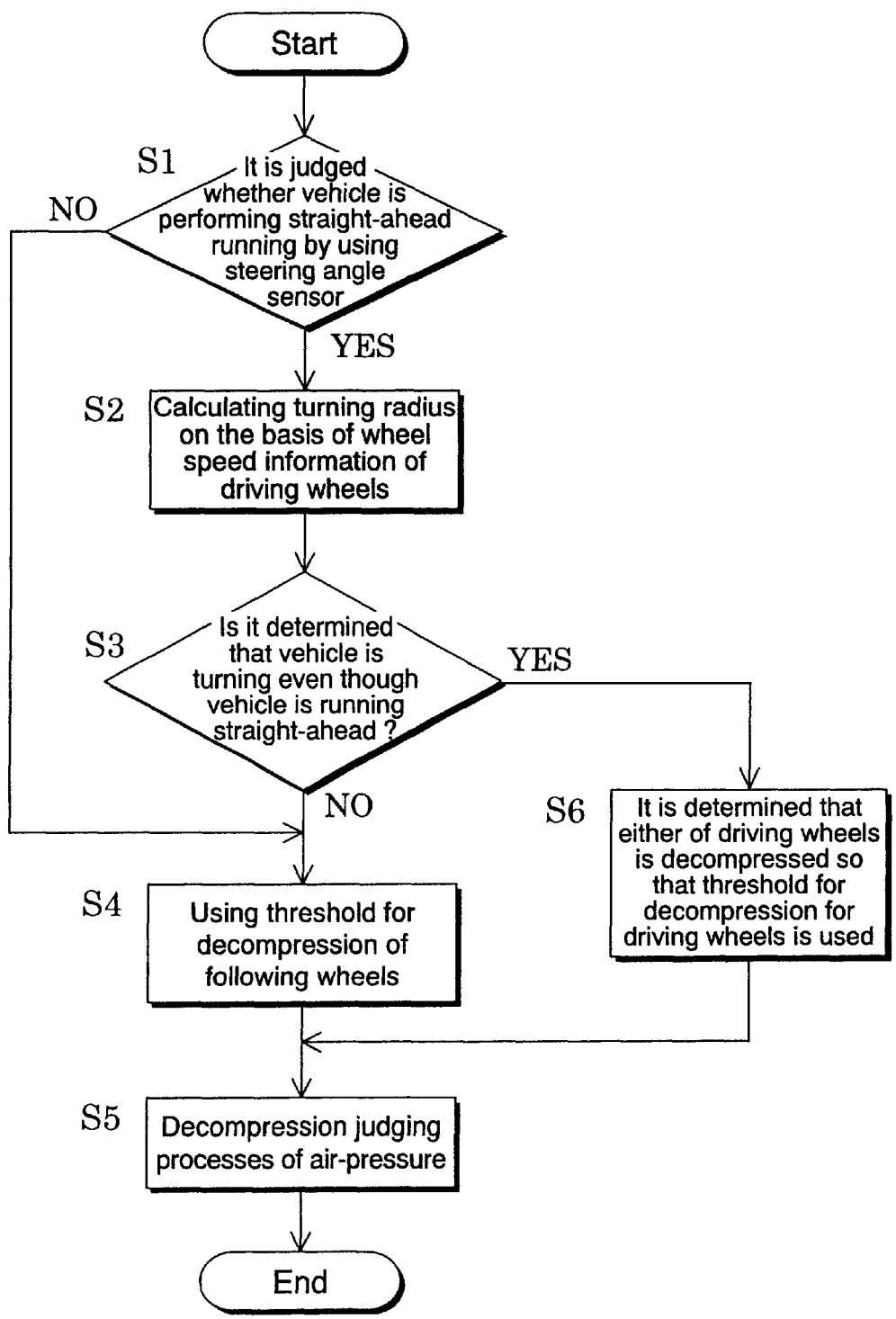
FIG. 3 is one example of a flowchart related to the present embodiment.
Figure 4:
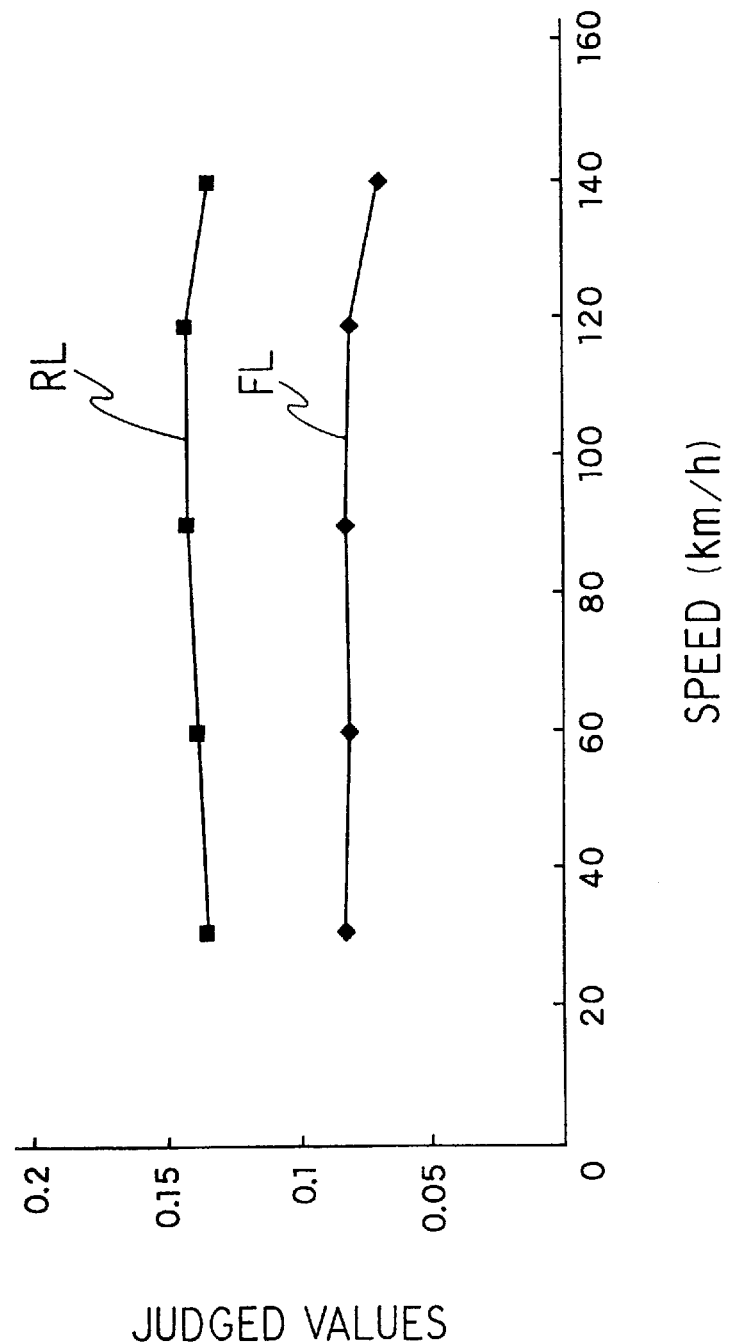
FIG. 4 is a view illustrating a relationship between judged values and speed of a front left tire and a rear left tire of which air-pressure is decreased by 30%, respectively.

As illustrated in FIG. 3, wheel speeds of the wheels are detected through the rotational information detecting means while it is judged whether the vehicle is performing straight-ahead running by using a steering angle sensor which serves as the steering angle detecting means (Step S1). Information obtained from the steering angle sensor, for instance, steering angle information from the steering angle detecting means are expressed as digital information of 256 levels, and it is judged whether they fall in the range of 126 to 129 (whether the vehicle is performing straight-ahead running) or not.

Then, the turning radius is calculated on the basis of wheel speed information of the driving wheels (Step S2). When the vehicles is running, for instance, on a corner, the driving wheel W1 located on inward of the corner is apt to slip so that it is inappropriate to accurately calculate the turning radius on the basis thereof, and only speeds V3 and V4 of the following wheel tires W3 and W4 are calculated. It should be noted that in case of calculating the turning radius on the basis of the wheel speed information of the driving wheel, only data obtained during deceleration (when the accelerator is not actuated) are employed for eliminating influences of slip.

However, the effective rolling radius r of the tire is not only changed through lateral acceleration (lateral G) of the vehicle but also through passengers riding on the vehicle or luggage mounted onto the vehicle. When taking a coefficient β into consideration which is a parameter of the load of the vehicle, the calculated speeds V3, V4 of the following wheel tires W3, W4 are corrected as follows.

$$Vl_3 = (1 + \beta \times \text{lateral } G) \times V3$$

$$Vl_4 = (1 + \beta \times \text{lateral } G) \times V4$$

In this manner, the turning radius R might be calculated through the following equation on the basis of the speeds $Vl_3$, $Vl_4$ of which variations owing to load shifts of the vehicle are eliminated.

$$R = \{(Vl_4 + Vl_3)/(Vl_4 - Vl_3)\} \times Tw/2$$

Here, $T_w$ denotes a distance between kingpins (tread width) (m).

It should be noted that the coefficient β is preliminarily obtained on the basis of the load of the vehicle as obtained through a load sensor and stored in the ROM of the control unit.

The reciprocal of the turning radius R of the vehicle (1/R) might also be obtained through the following equation in the case of a FF vehicle.

$$1/R = \{(Vl_3 - Vl_4)/(Vl_3 + Vl_4) \times T_W\}/(1 + 4 \times V^2 \times \text{coefficient } 3/(2 \times 9.8 \times T_W))$$

Here, $T_w$ denotes a distance between kingpins (tread width) (m).

It is then determined whether the calculated turning radius judges that the vehicle is turning even though the vehicle is running straight-ahead on the basis of the steering angle sensor (for instance, a turning movement with a turning radius R being not less than 1,000 m)(Step S3). If it is determined upon judgment on the basis of the calculated turning that the vehicle is running straight-ahead, it might be assumed that the driving wheels are not decompressed so that the threshold for decompression of following wheels of which sensitivity to decompression is higher (of which threshold is larger) for performing decompression judging processes of air-pressure upon comparing them with judged values obtained through equation (1)(Steps S4, S5). In contrast thereto, when it is judged on the basis of the calculated turning radius that the vehicle is not running straight-ahead, it is determined that either of the driving wheels is decompressed so that the threshold for decompression for the driving wheels is used for comparing the same with the judged value obtained through equation (1) for performing decompression judging processes (Steps S6, S5). It should be noted that the thresholds are obtained by preliminarily performing running with actual cars with each one of the following wheels and the driving wheels being in a decompressed condition.

As explained so far, according to the present invention, threshold for judging abnormalities in air-pressure are varied for judging abnormalities of tire air-pressures of following wheels and for judging abnormalities of tire air-pressure of driving wheels so that appropriate judgment of abnormalities in air-pressure can be performed.

What is claimed is:

1. A method for detecting decrease in tire air-pressure based on rotational information obtained from tires on front and rear wheels attached to a vehicle, comprising the steps of:

detecting the rotational information from the front and the rear tires and sending signals to a control unit;

detecting a steering angle and communicating a signal to the control storing the rotational information and the steering angle in the control unit;

judging, based on the steering angle, whether the vehicle is performing straight-ahead driving;

calculating a turning radius based on the rotational information of each of the tires;

determining, based on the turning radius, whether the vehicle is performing straight-ahead driving or not in case it has been determined on the basis of the steering-angle that the vehicle is performing the straight-ahead driving;

selecting thresholds for judging the decrease in the air-pressure of each of the tires; and calculating a judged value of decompression of the air-pressure of each of the tires and comparing the calculated judged valve with the selected thresholds to determine the decrease in the tire air pressure, wherein the thresholds for judging the decrease in the air-pressure of the rear wheels is different from the thresholds for judging the decrease in the air-pressure of the front wheels.

2. An apparatus for detecting a decrease in a tire air-pressure based on rotational information obtained from tires on front wheels and rear wheels attached to a vehicle, comprising:

a control unit;

rotational information detecting means for detecting the rotational information of each of the tires and communicating with the control unit;

steering angle detecting means for detecting a steering angle and communicating with the control unit;

the control unit including:
   memory means for storing the rotational information of each of the tires and the steering angle;

straight-ahead drive judging means for judging, based on the steering angle, whether the vehicle is performing straight-ahead driving;

turning radius calculating and processing means for calculating a turning radius on the basis of the rotational information of each of the tires;

comparing and determining means for determining, on the basis of the turning radius as calculated by the turning radius calculating and processing means, whether the vehicle is performing straight-ahead driving or not in case it has been determined on the basis of the steering angle that the vehicle is performing the straight-ahead driving;

threshold selecting means for selecting a threshold for judging the decrease in the air-pressure of each of the tires based on the determination of the comparing and determining means; and judged value calculating and processing means for calculating a judged value of decompression of the air-pressure of each of the tires and comparing the calculated judged valve with the selected thresholds to determine the decrease in the tire air pressure.

3. The apparatus of claim 2, wherein the comparing and determining means determines whether the tire air-pressure of the rear wheels is abnormal or the air-pressure of the front wheels is abnormal, based on the calculated judged value of the decompression of the air-pressure of each of the tires.

4. The apparatus for detecting a decrease in a tire air-pressure according to claim 2, wherein the steering angle from the steering angle detecting means is expressed as digital information of 256 levels, and if the steering angle falls within the range of 126 to 129, it is judged that the vehicle is performing the straight-ahead running.

5. The apparatus for detecting a decrease in a tire air-pressure according to claim 2, wherein the judged value of decompression for detecting decrease in air-pressure of each of the tires is calculating by comparing differences between two diagonal sums of the front wheel tires and the rear wheel tires, wherein a sum of the signals of one pair of wheels located on one diagonal line is subtracted from a sum of signals of another pair of wheels located on the other diagonal line, and a ratio of an obtained value to an average value of the two sums is obtained based on an equation as follows:

$$DEL = \{(V1+V4)/2 - (V2+V3)/2\} / \{(V1+V2+V3+V4)/4\} \times 100(\%)$$

wherein DEL is the judged value of decompression, and V1 and V2 velocities of the front wheels, and V3 and V4 are velocities of the rear wheels.

6. The apparatus for detecting a decrease in a tire air-pressure according to claim 2, wherein the front wheels are driving wheels and the rear wheels are following wheels.

7. A system for judging decompression of tires of front and rear wheels of a vehicle, comprising:

a computer;

rotational information detecting means for detecting rotational information each of the tires, and sending output signals to the computer;

steering angle detecting means for detecting a steering angle, and sending an output signal to the computer, the computer including:

memory means for storing the rotational information of each of the respective tires and the steering angle;

straight-ahead drive judging means for judging, based on the steering angle, whether the vehicle is performing straight-ahead driving;

turning radius calculating and processing means for calculating a turning radius on the basis of the rotational information of each of the tires;

comparing and determining means for determining, on the basis of the turning radius as calculated by the turning radius calculating and processing means, whether the vehicle is performing straight-ahead driving or not in case it has been determined on the basis of the steering angle that the vehicle is performing straight-ahead driving;

threshold selecting means having a selecting program for selecting a threshold for judging the decrease in the air-pressure of each of the tires based on the determination of the comparing and determining means; and judged value calculating and processing means for calculating a judged value of decompression of the air-pressure of each of the tires of each of the tires and comparing the calculated judged valve with the selected thresholds to determine the decrease in the tire air pressure.

8. The system according to claim 7, wherein the steering angle from the steering angle detecting means is expressed as digital information of 256 levels, and if the steering angle falls within the range of 126 to 129, it is judged that the vehicle is performing the straight-ahead running.

9. The system according to claim 7, wherein the front wheels are driving wheels and the rear wheels are following wheels.

* * * * *